United States Patent
Bishwas

(10) Patent No.: US 11,542,615 B2
(45) Date of Patent: Jan. 3, 2023

(54) METHOD OF PRODUCING AN ELECTROCATALYST

(71) Applicant: HYMETH APS, Søborg (DK)

(72) Inventor: Sumon Bishwas, Brøndby Strand (DK)

(73) Assignee: Hymeth APS

( * ) Notice: Subject to any disclaimer, the term of this patent is extended or adjusted under 35 U.S.C. 154(b) by 0 days.

(21) Appl. No.: 16/648,891

(22) PCT Filed: Sep. 19, 2018

(86) PCT No.: PCT/EP2018/075335
§ 371 (c)(1),
(2) Date: Mar. 19, 2020

(87) PCT Pub. No.: WO2019/057763
PCT Pub. Date: Mar. 28, 2019

(65) Prior Publication Data
US 2020/0248323 A1 Aug. 6, 2020

(30) Foreign Application Priority Data

Sep. 21, 2017 (EP) ..................................... 17192444

(51) Int. Cl.
| | | |
|---|---|---|
| C25B 11/075 | (2021.01) | |
| C25B 1/04 | (2021.01) | |
| C25D 3/56 | (2006.01) | |
| C25D 5/48 | (2006.01) | |
| C25F 3/06 | (2006.01) | |

(52) U.S. Cl.
CPC .............. *C25B 11/075* (2021.01); *C25B 1/04* (2013.01); *C25D 3/562* (2013.01); *C25D 5/48* (2013.01); *C25F 3/06* (2013.01)

(58) Field of Classification Search
CPC ........................... C25B 1/04–12; C25D 3/562
See application file for complete search history.

(56) References Cited

U.S. PATENT DOCUMENTS

| | | | |
|---|---|---|---|
| 3,489,661 A * | 1/1970 | Chezel | C25D 3/562 205/260 |
| 4,169,025 A | 9/1979 | Needes | |
| 4,184,941 A | 1/1980 | Carlin | |
| 4,251,478 A | 2/1981 | Welch et al. | |
| 4,366,041 A | 12/1982 | Korach et al. | |
| 5,645,930 A | 7/1997 | Tsou | |
| 2005/0194066 A1 | 9/2005 | Duruz et al. | |
| 2006/0166474 A1 * | 7/2006 | Vereecken | C25D 5/02 438/584 |
| 2010/0147800 A1 | 6/2010 | Li et al. | |
| 2010/0282613 A1 * | 11/2010 | Schuh | C25D 5/18 205/170 |
| 2011/0048962 A1 * | 3/2011 | Reece | B01J 23/8953 205/633 |
| 2013/0118912 A1 | 5/2013 | Reece et al. | |
| 2014/0004441 A1 | 1/2014 | Cho et al. | |
| 2015/0167181 A1 * | 6/2015 | Vaden | H01M 4/9083 205/639 |
| 2015/0184309 A1 * | 7/2015 | Zhang | C25F 3/02 205/662 |
| 2016/0376712 A1 * | 12/2016 | Ono | C25B 1/003 204/230.5 |
| 2017/0233885 A1 * | 8/2017 | Joya | C25B 1/04 205/217 |
| 2019/0078220 A1 * | 3/2019 | Kato | C25B 1/10 |

FOREIGN PATENT DOCUMENTS

| | | |
|---|---|---|
| CN | 85108093 A | 8/1986 |
| CN | 1031866 A | 3/1989 |
| CN | 105633420 A | 6/2016 |
| CN | 105664937 A * | 6/2016 |
| CN | 105839150 A | 8/2016 |
| CN | 106591926 A | 4/2017 |
| CN | 106676575 A | 5/2017 |
| GB | 907351 | 10/1962 |
| GB | 989003 | 4/1965 |
| JP | S5713187 A | 1/1982 |
| JP | S57152480 A | 9/1982 |
| KR | 2015044407 | 4/2015 |
| KR | 101561966 B1 | 10/2015 |
| WO | 2012086697 | 6/2012 |
| WO | 2012093880 | 7/2012 |
| WO | WO-2017179473 A1 * | 10/2017 ............... C25B 9/00 |

OTHER PUBLICATIONS

Koboski et al., Fabrication and Characterization of Electrodeposited Nanoporous Alloys, American Physical Society March Meeting 57(1) (Year: 2012).*
Koboski/Nelsen et al., Hydrogen evolution reaction measurements of dealloyed porous NiCu, 8:528 Nanoscale Research Letters (Year: 2013).*
Vossen et al., Thin Film Processes (Year: 1978).*
Lou et al., Electroplating, Encyclopedia of Chem. Proc. (Year: 2006).*
Hampton, Electrochemical Dealloying of Electrodeposited NiFeCu (Year: 2014).*
Kobosski, Kyla R., Hydrogen Evolution Reaction Measurements of Dealloyed Porous NiCu, Nanoscale Research Letters, Springer Journal, 2013, 8:528,pp. 1-7.
European Search Report for European Patent Application No. 17192444.2, dated Mar. 12, 2018, 7 pages.
Database WPI, XP-002778611, Clarivate Analytics, 2017, 2 pages.
PCT International Search Report and Written Opinion for PCT Patent Application No. PCT/EP2018/075335 dated Jan. 7, 2019. 16 pages.

(Continued)

*Primary Examiner* — Ho-Sung Chung
(74) *Attorney, Agent, or Firm* — McAndrews, Held & Malloy, Ltd.

(57) ABSTRACT

A method of producing an electrocatalyst, comprising the steps of: a) electrodeposition or electrochemical plating of an alloy comprising nickel and a second metal on a copper, nickel or other metal substrate; and b) electrochemical or chemical dissolution of deposited second metal to obtain a nanoporous structure on the copper, nickel or other metal substrate.

12 Claims, No Drawings

(56) References Cited

OTHER PUBLICATIONS

International Preliminary Examining Authority, PCT Notification of Transmittal of International Preliminary Report on Patentability for International Application No. PCT/EP02018/075335, international filing date of Sep. 18, 2018, dated Sep. 23, 2019, 11 pages.
Office Action for Korean Application No. 10-2020-7010878 dated May 6, 2020, 9 pages.
Koboski, et al., "Abstract Submitted for the Mar. 12 Meeting of The American Physical Society," Hope College Department of Physics, dated Nov. 20, 2011, 1 page.
Office Action for Chinese Patent Application No. 201880061421.1 dated Nov. 11, 2020, 10 pages.
Search Report for or Chinese Patent Application No. 201880061421.1 dated Nov. 5, 2020, 4 pages.
Washington, et al., "Characterization of electrodeposited and dealloyed NiFeCu thin films," Abstracts of Papers of the American Chemical Society, vol. 247, abstract of conference: 191-COLL, Mar. 16, 2014, 1 page.
Cao, et al., "A Technological and Performance Review of Chemically Prepared Porus Metalic Materials," vol. 31, Issue 11, Nov. 2017, pp. 139-145.
Office Action for Japanese Application No. 2020-537857 dated Nov. 17, 2020, 8 pages.
CNIPA, "Rejection Decision," issued in Application No. 201880061421.1, dated Aug. 3, 2021, 14 pages.

\* cited by examiner

METHOD OF PRODUCING AN ELECTROCATALYST

CROSS-REFERENCE TO RELATED APPLICATIONS/INCORPORATION BY REFERENCE

The present application is the U.S. national phase under § 371 of International Application No. PCT/EP2018/075335, having an international filing date of Sep. 19, 2018, which claims priority to EP Patent Application No. 17192444.2, filed Sep. 21, 2017. Each of the above-mentioned prior-filed applications is hereby expressly incorporated herein by reference in its entirety.

TECHNICAL FIELD

The present disclosure generally relates to electrocatalysts. In particular, it relates to a method of producing an electrocatalyst and to an electrocatalyst.

BACKGROUND

Electrolysis of water is a process in which water molecules are decomposed, forming hydrogen gas and oxygen gas. This process occurs as a result of an electric current flowing between two electrodes submerged in water.

An electrolyte is typically added to the water prior to electrolysis to increase the electric conductance of the water. This ensures a more efficient electrolysis process due to the better charge carrying characteristics. Adding an electrolyte may however result in that undesired by-products are created during the electrolysis process.

Purified water may be used for the purpose of electrolysis, essentially eliminating the creation of undesired by-products. However, due to the inherent properties of purified water such as low electrical conductance, it may be more difficult to initiate an efficient electrolysis process in purified water.

SUMMARY

An object of the present disclosure is to improve or at least reduce the problems of the prior art.

There is hence according to a first aspect of the present disclosure provided a method of producing an electrocatalyst, comprising the steps of: a) electrodeposition or electrochemical plating of an alloy comprising nickel and a second metal on a copper, nickel or other metal substrate; and b) electrochemical or chemical dissolution of deposited second metal to obtain a nanoporous structure on the copper, nickel or other metal substrate.

The porous structure increases the surface area of the electrocatalyst which makes the electrochemical reaction more efficient. For example, if the electrocatalyst is used as an electrode in an application of electrolysis of water, the active area of the electrode which is in contact with the water is increased. The contact area with the water molecules is thus increased. A more efficient electrolysis reaction and a compact electrolyser may hence be obtained.

Moreover, in case the electrocatalyst forms part of an electrode for electrolysis, the current density in water to be subjected to electrolysis may be increased. The current density may be increased due to the porous structure of the electrocatalyst, providing a larger surface area of the e.g. copper-based electrode in contact with the water.

Additionally, since copper has low electrical resistivity there will only be low electrical losses during electrolysis. Hence, less heat is generated by the electrolysis device including the electrode, increasing the efficiency of the overall electrolysis. Less heat also avoids steam generation.

The electrocatalyst is furthermore very cost effective and mass production friendly.

According to one embodiment, a step of heat treatment of the copper substrate is provided after step a) but before step b).

During heat treatment the copper substrate provided with the alloy comprising nickel and the second and/or a third metal may be subjected to a temperature of at least 250° C., for example at least 275° C., such as at least 300° C., such as at least 325° C. or at least 350° C. The heat treatment may be provided under normal atmospheric conditions. The heat treatment may for example proceed for at least 20 minutes, such as at least 25 minutes, for example at least 30 minutes before step b).

The electrochemical or chemical dissolution in step b) may be a dealloying step, such as an electrochemical dealloying or a chemical dealloying.

According to one embodiment the second metal is copper or iron.

According to one embodiment the second metal is copper and the method further comprises the step of: c) deposition of iron on the porous structure. Step c) may be performed after step b). Electro deposition of iron on a copper electrode having a porous nickel surface increases the current density per $cm^2$ of the electrode, for example in an electrolysis application.

To electrodeposit iron on porous structure, ferrous/iron (II) sulphate heptahydrate $FeSO_4.7H_2O$ and/or ferrous (II) chloride 0.86 Molar (11% concentration) and sodium citrate ($Na_3C_6H_5O_7$) or boric acid ($H_3BO_3$) as a pH buffer may be used to prepare an electroplating bath solution.

According to one embodiment the second metal is iron and the method further comprises the step of: c) deposition of copper on the porous structure. Step c) may be performed after step b).

According to one embodiment the alloy of step a) further comprises a third metal, such as copper or iron, which third metal is different from the second metal.

According to one embodiment the third metal is copper or iron. Thus, if the second metal is copper, the third metal is iron. If the second metal is iron, the third metal is copper. An alloy comprising nickel, copper and iron provides higher surface area, improved efficiency and current density of an electrolysis process and improved stability compared to a nickel-copper alloy.

Different surface morphology may be obtained by using different electroplating and electrochemical dissolution/dealloying conditions. For example, a different surface morphology and current density is obtained if copper-iron is dealloyed from a copper-iron-nickel alloy than if only copper is dealloyed from a nickel-copper alloy.

According to one embodiment the second metal is copper and an electroplating solution comprising a copper salt, such as $CuSO_4$, and a nickel salt, such as $NiSO_4$, is used in step a).

According to one embodiment an electroplating solution comprising a copper salt, such as copper sulphate ($CuSO4$), a nickel salt, such as nickel sulphate ($NiSO4$), and sodium citrate ($Na3C6H5O7$) or boric acid ($H3BO3$) as pH buffer is used in step a).

According to one embodiment the molar ratio of copper to nickel in the electroplating solution is between 1:1 and 1:3, such as between 1:1.5 and 1:2.5, such as between 1:1.8 and 1:2.2.

According to one embodiment an electroplating solution comprising a copper salt, such as copper sulphate, ($CuSO_4$), a nickel salt, such as nickel sulphate ($NiSO_4$), an iron salt such as iron sulphate ($FeSO_4$) and sodium citrate ($Na_3C_6H_5O_7$) or boric acid ($H_3BO_3$) as a pH buffer is used in step a).

According to one embodiment an electroplating solution comprising a nickel salt, such as nickel sulphate ($NiSO_4$), and an iron salt such as iron sulphate ($FeSO_4$) and sodium citrate ($Na_3C_6H_5O_7$) or boric acid ($H_3BO_3$) as a pH buffer is used in step a).

The electroplating solution may for example be aqueous.

In one embodiment, the concentration of nickel is higher than the concentration of copper in the electroplating solution. In particular, the concentration of nickel may be higher than the concentration of copper in a copper-nickel electroplating solution.

The concentration of nickel may be higher than iron in an iron-nickel electroplating solution and in a nickel-copper-iron electroplating solution.

According to one embodiment a voltage of 2-6 V in a two electrode setup is applied in step a). Thus, in one embodiment the electrodeposition in step a) is performed by applying a voltage difference in the range of 2-6 V between the copper substrate and a second electrode in a two-electrode setup.

According to one embodiment the electrodeposition in step a) involves applying a voltage lower than –0.5 V vs saturated calomel electrode (SCE), for example between –0.8 V and –0.9 V vs SCE, such as at least –0.92 V vs SCE between the copper substrate and a reference electrode in a three electrode setup.

According to one embodiment a solution comprising sulphate ions, such as a potassium sulphate ($K_2SO_4$) solution, an alkaline solution or an acidic solution is used in step b). The solution may for example be aqueous. Examples of suitable alkaline solutions are potassium hydroxide and sodium hydroxide. Examples of suitable acidic solutions are hydrochloric acid and sulphuric acid.

Potassium sulphate makes a better dealloying solution/electrolyte/chemical bath for electrochemical dealloying of copper or/and iron from a copper-nickel and nickel-copper-iron alloy. It can be an anodic dealloying, which means that the copper substrate coated with any of the above mentioned alloy which is subject to an electrochemical dealloying is connected to the positive terminal of the power supply in a two electrode setup or connected as a working electrode in a three electrode setup.

According to one embodiment a voltage of 1-12V, such as 2-3 V, is applied in step b) in a two electrode setup. Thus, in one embodiment the chemical dissolution in step b) is performed by applying a voltage difference in the range of 1-12 V between the copper substrate and a second electrode in a two-electrode setup.

According to one embodiment a pulsed voltage is applied in step b). A higher pulse voltage creates a higher surface area. In a three electrode setup, for example, the voltage range may be 1-4 V, such as 1-3 V vs SEC. High pulse voltage parameters may for example be [t1=1 s, V1=2.5 V; t2=5 s, V2=0.005 V] where t1=1 second 2.5 volt then t2=5 second 0.005 volt, applied for approximately 15 minutes.

By using a higher pulsed voltage in step b) more copper or iron, or both may be pushed out from a copper-nickel or nickel-copper-iron alloy.

According to one embodiment step c) is an electrodeposition.

One embodiment further comprises the step of d) passivating the deposited iron.

According to one embodiment the copper substrate comprises a copper coil. The copper coil is hence subjected to the treatment of steps a)-b). By performing steps a)-b) after the copper coil has been formed from a copper wire, a more uniform coverage of the copper coil may be obtained than if the copper coil would have been formed after steps a)-b). A coil-shaped electrocatalyst has been found to provide for a particularly efficient electrolysis process.

According to one embodiment the other metal is one of iron, cobalt, titanium, zirconium, stainless steel and aluminium.

According to one embodiment the copper or nickel substrate is a porous copper or nickel substrate.

There is according to a second aspect of the present disclosure provided an electrocatalyst obtainable by means of the method of the first aspect.

According to one embodiment the second metal is copper or iron.

The nanoporous structure may comprise a third metal, which is different from the second metal. The third metal may for example be copper or iron. Thus, if the second metal is copper, the third metal is iron. If the second metal is iron, the third metal is copper.

There is according to a third aspect of the present disclosure provided an electrode for electrolysis, which electrode comprises the electrocatalyst of the second aspect. The copper substrate comprises a copper coil, which is covered by the nanoporous structure comprising nickel and preferably the second metal, and optionally also the third metal.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

DETAILED DESCRIPTION

The present disclosure relates to a method of producing an electrocatalyst and to an electrocatalyst suitable for both oxygen and hydrogen evolution reaction in alkaline water electrolysis. The electrocatalyst may advantageously form part of an electrode for an electrolysis process.

The method of producing an electrocatalyst comprises a step a) of electrodeposition of an alloy comprising nickel and a second metal on a copper substrate.

Step a) of electrodeposition may for example be an electrochemical deposition or a pulse electrodeposition. If pulse electrodeposition is used, i.e. a pulsed voltage is applied, a low pulsed voltage may be used compared to the voltage applied during electrochemical dissolution/dealloying. For example, in a three electrode setup, a low pulsed voltage may be a voltage of –0.92 V for 5 seconds and then –0.005 V for 1 second. These pulses may for example be applied for around 15-30 minutes.

The chemical bath used in step a), i.e. in which the copper substrate is submerged, may for example include an electroplating solution comprising a copper salt, such as $CuSO_4$, and a nickel salt, such as $NiSO_4$. The electroplating solution may preferably be aqueous.

In one example, a constant voltage may be applied to the copper substrate during step a) to perform the electrodeposition of the alloy on the copper substrate. The applied voltage may for example be in the range of 2-6 V between the copper substrate and a second electrode in a two-electrode setup.

In one variation, the second metal is copper. In this case, the alloy is a copper-nickel alloy.

In another variation, the second metal is iron. In this case, the alloy is a nickel-iron alloy.

In yet another variation, the alloy also comprises a third metal. In this case the second metal may for example be copper and the third metal may be iron. Thus, in this case, the alloy is a nickel-copper-iron alloy.

In one variation, the copper substrate provided with the alloy obtained in step a) is subjected to a heat treatment. This heat treatment is preferably performed before step b) described below.

Heat treatment before step b) initiates a diffusion mechanism in a nickel-copper alloy, a nickel-copper-iron alloy or nickel-iron alloy on a copper substrate. Heat treatment after step a) significantly reduces the formation of any nanocracks on the alloy coating in case high pulse voltage electrochemical dealloying is used in step b). It might also improve the stability and activity of the electrocatalyst. A more homogeneous nanoporous surface structure is obtained after step b) if the copper substrate has been subjected to a heat treatment after step a). Heat treatment increases the current density if the copper substrate/electrocatalyst is used as an electrode.

In a step b) the copper substrate is subjected to an electrochemical dissolution of deposited second metal to obtain a nanoporous structure on the copper substrate.

The electrochemical dissolution may involve dealloying. The dealloying may for example be electrochemical dealloying or pulse electrochemical dealloying.

The chemical bath used in step b) may for example include a dealloying solution comprising sulphate ions, such as a potassium sulphate $K_2SO_4$ solution.

According to one example, in step b) a voltage in the range of 1-12 V, such as 2-3 V, is applied between the copper substrate provided with the deposited alloy and a second electrode in a two-electrode setup.

In one variation, a constant voltage may be used during step b) to perform the electrochemical dissolution of the deposited second metal on the copper substrate. Alternatively, a pulsed voltage may be used during step b) to perform the electrochemical dissolution. In another variation, constant voltage may be combined with a pulsed voltage; for example during one portion of the dealloying, constant voltage may be applied and during another portion a pulsed voltage may be applied.

In the case when the alloy is a copper-nickel alloy, at least a portion of the deposited copper is electrochemically dissolved. Moreover, in this case, in a step c) iron is deposited on the porous structure obtained in step b). The deposition in step c) is preferably electrodeposition.

One variation comprising step c) further comprises a step d) of passivating the deposited iron.

In case the alloy is a nickel-iron alloy, at least a portion of the deposited iron is electrochemically dissolved. In this case, in an optional step c) copper may be deposited on the porous structure obtained in step b). The deposition in step c) is preferably electrodeposition.

In case the alloy is a nickel-copper-iron alloy, at least a portion of the deposited iron and deposited copper is electrochemically dissolved in step b).

EXAMPLE 1

Chemicals and Setup

The following describes the experimental procedure to obtain about 4 cm long high surface area copper wires, with diameter about 1 mm. The copper wires are in this example the copper substrates to be subjected to steps a) and b). The copper wires had a 99.9% degree of purity.

Chemicals: boric acid (H3BO3, 99.97%), sodium sulphate (Na2SO4, 99.99%), copper sulphate pentahydrate (CuSO4.5H2O, analytical grade 99-100.5%), nickel sulphate hexahydrate (NiSO4.6H2O, 98%).

Electrochemical Treatments:

A three-electrode cell was connected to a potentiostat, where a saturated calomel electrode (SCE) is used as a reference electrode and a carbon electrode as a counter electrode. A large volume of electroplating solution containing a source of nickel and a second metal (30 mL) was chosen to ensure complete coverage of the electrodes.

It is to be noted that it is possible to scale down the volume of both for electroplating solution and the dealloying solution and still achieve the same results.

An electrodeposition of an alloy comprising nickel and copper was performed. The deposition of nickel and copper on the copper wires was made from an electroplating solution containing: 0.5 M H3BO3, 0.5 M NiSO4 and 0.005 M CuSO4, resulting in a 1:100 ratio of Cu:Ni. About 3-3.5 cm of the copper wires was immersed in the solution. A constant voltage of −0.92 V (vs. SCE) was applied for 15 minutes.

The copper wires provided with the nickel-copper layer obtained during the electroplating were then rinsed briefly with deionised water before proceeding to the electrochemical dissolution step, which in the present example is a dealloying step. The dealloying solution consisted of 0.5 M H3BO3 and 0.5 M Na2SO4 for a total volume of 30 mL. The copper wires provided with a copper-nickel layer were immersed in the dealloying solution and dealloyed by applying a constant voltage of 2.5 V (vs SCE) for 15 minutes.

EXAMPLE 2

Example 2 is similar to example 1 concerning the chemicals and setup. The electrodeposition step is also the same as in example 1. During the electrochemical dissolution step, also here dealloying, a different voltage profile is however applied.

Instead of a constant voltage, a "low" pulsed voltage or a "high" pulsed voltage was used. The parameters for "low" pulsed voltage were [t1=1 s, V1=0.5 V; t2=5 s, V2=0.005 V] meaning that a voltage of 0.5 V is applied for 1 second, before applying 0.005 V for 5 seconds and repeating the process for a total time of 15 minutes. For a "high" pulse voltage the parameters are [t1=1 s, V1=2.5 V; t2=5 s, V2=0.005 V].

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. Method of producing an electrocatalyst, comprising:
electrodeposition of an alloy comprising nickel, a second metal which is copper, and a third metal which is iron on a metal substrate selected from the group consisting of copper, nickel, iron, cobalt, titanium, zirconium, stainless steel and aluminium, wherein the electrodeposited nickel, copper, and iron are provided as a solution;
subjecting the alloy obtained in the electrodeposition of the alloy to a heat treatment comprising a temperature of at least 250° C. for at least 20 minutes;
electrochemical or chemical dissolution of deposited second metal to obtain a nanoporous structure on the metal substrate; and
deposition of iron on the nanoporous structure.

2. The method of claim 1, wherein an electroplating solution comprising a copper salt and a nickel salt is used in the electrodeposition of the alloy.

3. The method of claim 2, wherein the copper salt is $CuSO_4$.

4. The method of claim 2, wherein the nickel salt is $NiSO_4$.

5. The method of claim 2, wherein the electroplating solution has a molar ratio of copper to nickel of between 1:1 and 1:3.

6. The method of claim 1, wherein a voltage of 2-6 V in a two electrodes setup is applied in the electrodeposition of the alloy.

7. The method of claim 1, wherein a solution comprising sulphate ions, an alkaline solution or an acidic solution is used in the electrochemical or chemical dissolution of the deposited second metal.

8. The method of claim 1, wherein a voltage of 1-12 V is applied in a two electrodes setup.

9. The method of claim 1, wherein a pulsed voltage is applied in the electrochemical or chemical dissolution of the deposited second metal.

10. The method of claim 1, further comprising passivating the iron on the nanoporous structure.

11. The method of claim 1, wherein the metal substrate comprises a copper coil.

12. The method of claim 1, wherein the metal substrate is a porous copper or nickel substrate.

* * * * *